United States Patent
Ashmead

(10) Patent No.: US 6,547,280 B1
(45) Date of Patent: Apr. 15, 2003

(54) ENERGY-ABSORBING STRUCTURES

(75) Inventor: Michael Ashmead, Huntingdon (GB)

(73) Assignee: Cellbond Limited (GB)

( * ) Notice: Subject to any disclaimer, the term of this patent is extended or adjusted under 35 U.S.C. 154(b) by 0 days.

(21) Appl. No.: 09/439,415

(22) Filed: Nov. 11, 1999

(30) Foreign Application Priority Data

Nov. 21, 1998 (GB) .............................................. 9825488
Aug. 9, 1999 (GB) .............................................. 9918679

(51) Int. Cl.[7] .............................................. B60R 21/04
(52) U.S. Cl. ...................... 280/751; 280/730.1; 180/90; 296/189
(58) Field of Search ................................ 280/751, 752, 280/730.1, 739, 729, 748; 180/90; 296/189, 214, 203.01

(56) References Cited

U.S. PATENT DOCUMENTS

| | | | |
|---|---|---|---|
| 2,604,349 A | 7/1952 | Martinetz ..................... | 293/70 |
| 3,506,295 A | 4/1970 | Yancey ........................ | 293/70 |
| 5,067,367 A | 11/1991 | Hashiba et al. ............... | 74/552 |
| 5,348,798 A | 9/1994 | Berghuis et al. ............ | 428/285 |
| 5,435,619 A | 7/1995 | Nakae et al. ................ | 296/189 |
| 5,700,545 A | 12/1997 | Audi et al. .................. | 428/131 |
| 5,833,304 A | 11/1998 | Daniel et al. ................ | 296/214 |
| 6,017,084 A | 1/2000 | Carroll, III et al. ......... | 296/189 |
| 6,199,942 B1 | 3/2001 | Carroll, III et al. ......... | 296/189 |
| 6,247,745 B1 | 6/2001 | Carroll, III et al. ......... | 296/189 |
| 2002/0017805 A1 | 2/2002 | Carroll, III et al. ......... | 296/189 |

FOREIGN PATENT DOCUMENTS

| | | |
|---|---|---|
| DE | 4311978 C1 | 4/1994 |
| EP | 0022884 A1 | 1/1981 |
| EP | 0 652 388 A1 | 10/1994 |
| GB | 1305489 | 1/1973 |
| GB | 1319674 | 6/1973 |
| GB | 1420929 | 1/1976 |
| GB | 1424567 | 2/1976 |
| GB | 1555152 | 11/1979 |
| WO | WO 82/02078 | 6/1982 |

*Primary Examiner*—Kenneth R. Rice
*Assistant Examiner*—Christopher Buchanan
(74) *Attorney, Agent, or Firm*—Sheridan Ross P.C.

(57) ABSTRACT

An energy absorbing sheet 1 has alternating front 3 and rear 5 projections at angles between 25 to 60 degrees from the plane of the sheet. The sheet absorbs impact by plastic deformation such that the curve of stress to deformation shows a plateau for example at a level of stress which does not break bone. The sheet 1 may be made of aluminium.

17 Claims, 6 Drawing Sheets

ENERGY-ABSORBING STRUCTURES

FIELD OF THE INVENTION

The invention relates to sacrificial energy-absorbing structures constructed and intended to deform permanently in absorbing energy. Such structures find use in crash protection for automobiles and other vehicles to protect the occupants of the vehicles or other road users.

DESCRIPTION OF THE PRIOR ART

It is known to provide such deformable structures in the form of an array of honeycomb-shaped cells, the walls of which are made from a material such as metal foil, and which array is progressively crushed to absorb kinetic energy, e.g. in an automobile accident. Such honeycomb structures are effective as crash protection for automobiles and the like but are difficult and thus expensive to make. Therefore, such structures are unlikely to be widely adopted in cheaper motor vehicles. One such structure is described in WO98/06553 (Cellbond Composites Ltd and Bayerishe Motoren Werke AG).

A structure is described in GB 1 225 681 as a core material for a lightweight structure. The structure is intended to have a maximum strength for lowest cost, and there is no mention of energy absorption. Indeed, the drawings show sidewalls that are too close to perpendicular to the plane of the sheet for good energy absorption by plastic deformation. Another prior art document, GB 1 305 489, describes a packaging material for use in containers to prevent breakage. That document describes the use of microcellular expanded polystyrene. Such a material would be far too soft to absorb any significant amount of energy in a vehicle crash, and hence would not avoid injury. A further document, GB 1 420 929, describes a "cuspated" sheet material that is said to be suitable for a variety of uses. The material has narrow "cusps" and the sidewalls of the "cusps" are too close to the direction perpendicular to the sheet to plastically deform properly to absorb impact.

SUMMARY OF THE INVENTION

According to the invention there is provided an energy-absorbing vehicle component for reducing the risk of injuries, wherein the component comprises a sheet extending substantially in a median plane and formed to have a pattern of alternating front and rear projections in front of and behind the median plane. The projections are arranged to alternate in two directions in the median plane. The sheet is at an angle of 25 to 60 degrees from the median plane of the sheet at the position of maximum steepness on the line between a front projection and an adjacent rear projection. The component absorbs impact by plastic deformation of the sheet such that the curve of stress normal to the median plane to deform the sheet against the deformation exhibits a plateau at a predetermined level.

The angle is shown as θ on FIG. 2. The maximum steepness preferably occurs midway between the adjacent front and rear projections. Indeed, the sheet is preferably smooth from one front peak to an adjacent rear peak.

It is not necessary that the median plane be flat. Rather, it is the notional plane that locally represents the position of the sheet with the projections smoothed out. If in addition to the projections the component is macroscopically curved over its surface, for example to fit the interior of a motor vehicle, then the median plane will not be flat over the whole surface. The projections extend in front of and behind this notional median plane.

The pattern of projections need not have the same number of front projection adjacent to every rear projection, nor must the front and rear projections necessarily have the same shape. Indeed, it is possible that the front or rear projections are joined together in groups; this can occur if only front projections are formed in a flat sheet. The portion of the sheet that is unformed then constitutes linked rear projections behind the notional median plane.

By a plateau is meant a substantially flat region of the curve, in which a percentage change in deformation is accompanied by a much smaller percentage change in applied stress. By "much smaller" is meant that the percentage change of applied stress is at most 15% of the percentage change in deformation, preferably at most 10% or further preferably at most 5%.

An alternative definition of plateau, also intended, is that the curve does not deviate by more than 10%, preferably 5%, from the predetermined level.

The flat region of the curve preferably extends from a deformation of at most 70%, further preferably at most 50% or even 35% of the deformation at the maximum deformation of the plateau up to that maximum plateau deformation. Accordingly, the plateau can cover 65% of the range of deformation available.

The predetermined plateau level may be a level of stress that does not cause serious injury or that avoids death when a human body part such as a head impacts the energy-absorbing sheet. The level may be in the range 0.2 to 0.3 MPa. The level may be arrived at by determining the material of the sheet, the thickness of the sheet, the pitch density of projections over the area of the sheet, and the shape of the projection.

The projections may cover at least 80% of the area of the sheet leaving no substantial areas therebetween.

The most commonly used energy absorber at present is a rigid polyurethane foam. In tests, one of which is presented later, the deformation of such a foam does not show a plateau in the same way as the formed sheet energy absorber according to the invention.

The human body, especially the human head, can take certain levels of stress before injury or death. These levels are specified by car manufacturers when selecting energy absorbing materials for use in their vehicles. A plateau on the stress-deformation graph allows greater energy absorption without injury or death than a more proportional stress-deformation graph as seen in conventional foam.

The invention provides an energy absorbing material that can be manufactured much more cheaply than the honeycomb structure but can still provide good protection.

However, in spite of some similarities of structure, none of the prior documents discussed above suggests an energy-absorbing structure as described above; rather, they disclose cell structures for lightweight, strong materials. Plastic deformation to provide sacrificial energy absorption, would not be wanted in any such structure. None of the documents teaches forming a plateau in the stress-deformation curve in the manner of the structure according to the invention. The wall thickness of the projections may be no greater than that of the thickness of the undeformed sheet. The structure may be a composite in which the sheet forms a core and has a face sheet or skin applied to one or both sides. The face sheet(s) or skin(s) may be planar. A skin may be especially useful if the projections are large; this may be the case when thicker aluminium panels are used. Preferably the skins are attached in such a way that some lateral movement (in the plane of the component) is possible during impact. It has been found that sliding of the front and rear faces of the sheet against the skins during impact improves the impact-absorbing properties of the material.

The method of fixing the skin to the sheet may be to fix some (for example up to 20%) of the projections to the skin. Indeed, the skin can conveniently be fixed using just four projections. This leaves the remainder of the projections free to slide. The fixing may be carried out using welding, e.g. ultrasonic welding, rivets or clinching.

If all the peaks are to be bonded then it is preferred to use a weaker fixing method such as polyurethane adhesive which still allows movement during impact.

The material of the sheet may be aluminium, which is very lightweight. Alternatively, thermoplastics may be moulded into a suitable shape.

The invention also envisages a vehicle comprising an energy-absorbing vehicle component as defined above. The component may be mounted behind the headlining of the vehicle to absorb impacts of the head of an occupant against the headlining during a crash. Alternatively, the material is sufficiently cheap and easy to form that the component may be mounted on the rear surfaces of seats in cars, aircraft or other vehicles to absorb the impact of the head or knees of an occupant sitting immediately behind the seat.

The component may be mounted behind a fabric sheet or other means to hide the component from view. The component can be mounted behind the headlining of a car.

A method of making an energy-absorbing component comprises providing a blank of sheet material and acting on the blank to deform the blank into a three-dimensional form. The deforming step may comprise a pressing operation. The deforming step may be such as to form discrete projections extending from the plane of the sheet and of the desired shape.

Thus the projections may, for example, be domed, pyramidal or the like. The projections may be frusto-conical. The projections may all be the same or may be different, e.g. in height and/or in shape as desired.

In some cases, the projections may be elongate, and may in the extreme case be corrugations extending the whole width of the sample. However, it is more difficult to get corrugations to give a good plateau than it is using preferred projections which are roughly as long as they are wide.

A solid lubricant may be used between the mould and the sheet to make pressing easier. The solid lubricant can be thin plastic sheet.

BRIEF DESCRIPTION OF THE DRAWINGS

Specific embodiments and comparative examples will now be described, purely by way of example, with reference to the accompanying drawings in which.

DESCRIPTION OF THE PREFERRED EMBODIMENTS

Figure 1:
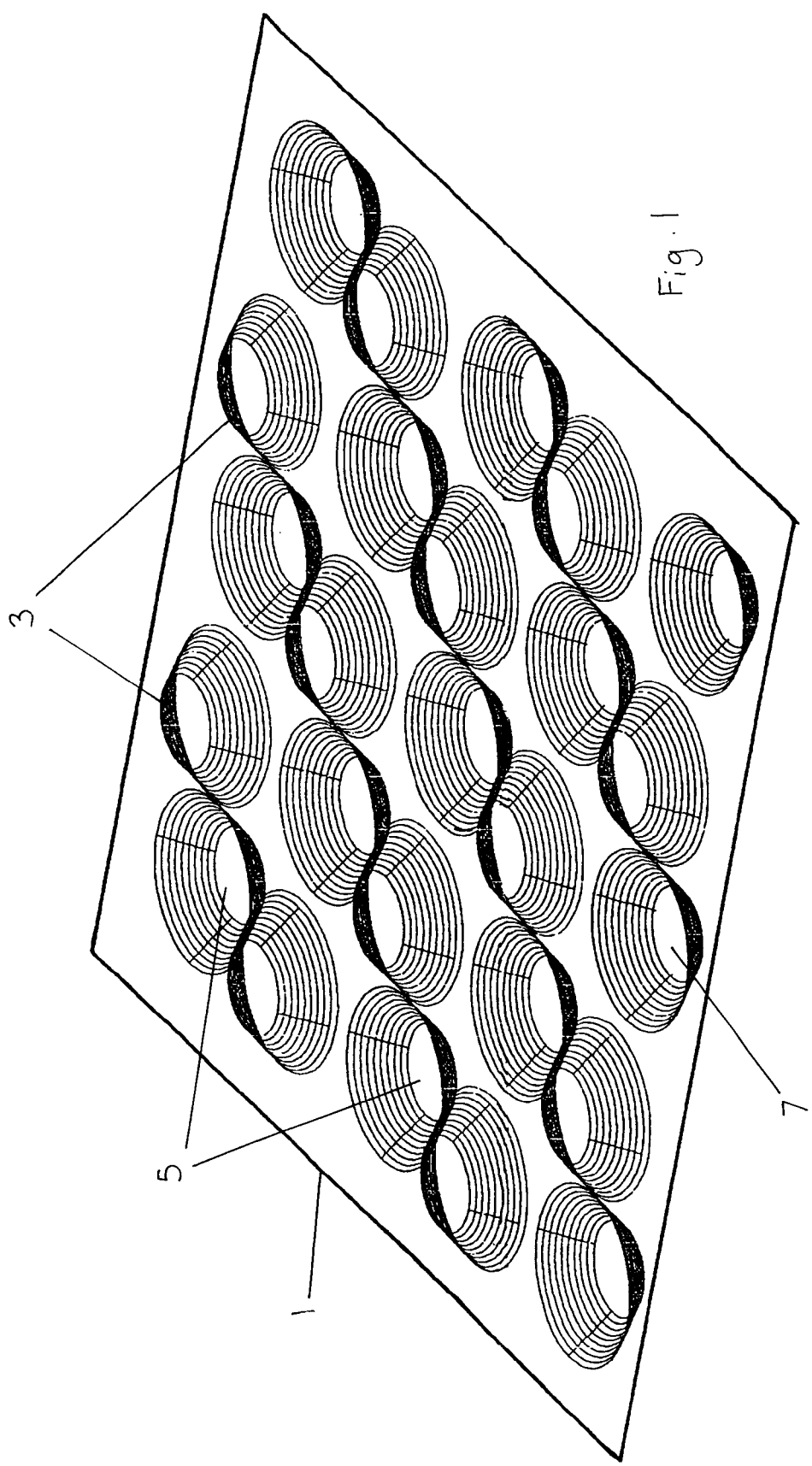
FIG. 1 shows a perspective view of a deformable structure according to the invention.

FIG. 1 shows an "eggbox" shaped aluminum sheet 1 having a pattern of alternating front projections 3 and rear projections 5, without substantial flat areas therebetween. The projections are arranged to alternate in two directions in the median plane. The term "aluminum" is intended to include alloys where aluminum is the predominant component. The tops 7 of the projections are substantially flat in this drawing; however, useful results have also been achieved with rounded projections. The exact shape can be modeled.

Figure 2:
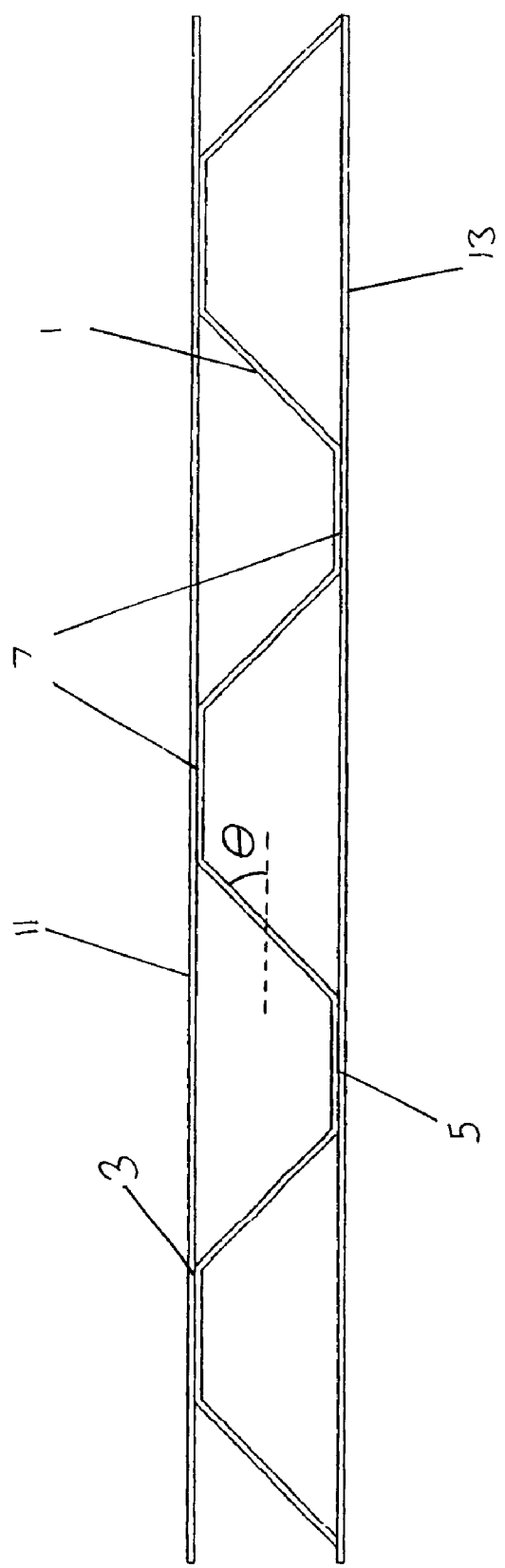
FIG. 2 is a side view of a composite deformable structure in which a sheet e.g. of the form shown in FIG. 1 forms the core of the composite deformable structure and which core is sandwiched between flat face sheets or skins which are attached to the core, e.g. by means of an adhesive.

FIG. 2 shows the same sheet 1 sandwiched between two skins 11,13. As can be seen, the portion of the sheet between the peaks is at an angle of 45 degrees to the plane of the component.

Figure 3:
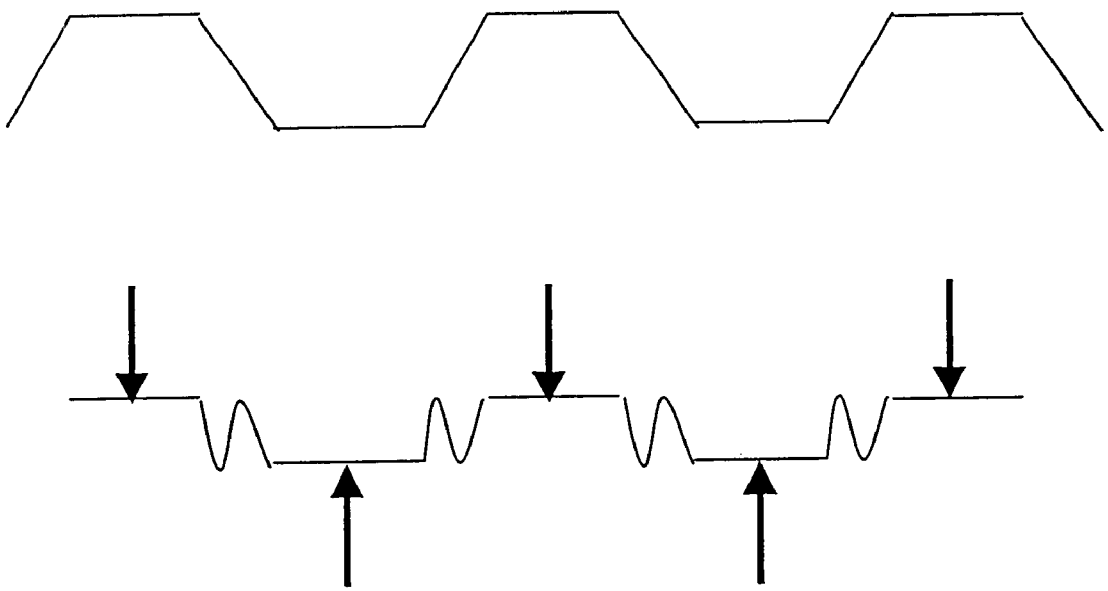
FIG. 3 shows a schematic of the deformation of the sheet.

The deformation process is illustrated in FIG. 3. As the sheet is deformed, the sheet absorbs the deformation by bending in the pitch region, i.e. the portion of the sheets between the tops of the projections. In order to get a homogeneous plateau in the stress-deformation graph cold hardening of this region is to be avoided. This can be done by controlling the pitch angle and geometry. Tests have shown that a shape as shown in FIG. 3 but with slightly rounded corners gives good results; in particular such shapes are easy to press. Further, where the pitch angle is outside the recommended limits of 25° to 60° the plateau is reduced or even removed.

EXPERIMENTAL RESULTS

A number of energy-absorbing components have been tested by measuring the stress that needs to be applied at increasing deformation. Such stress can be applied, i.e. statically, or by impacting a test object on the component, i.e. dynamically. Results are presented for a variety of test objects. Each test was repeated; the individual lines on each graph correspond to a single test.

Figure 4A:
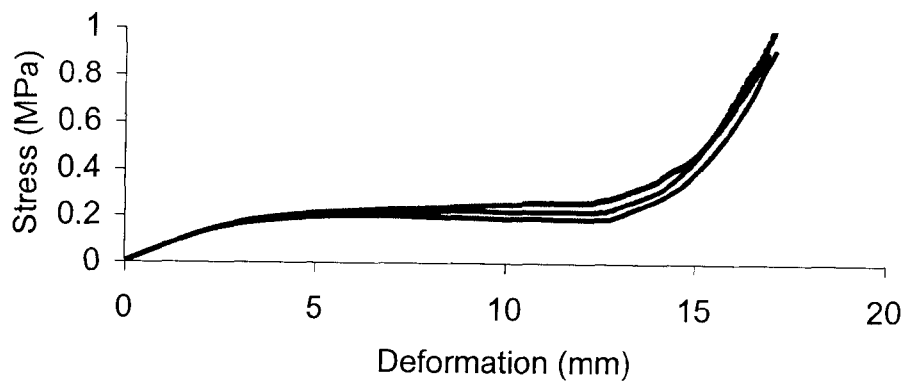
FIG. 4 shows graphs of static stress against deformation for three sheet thicknesses.
Figure 4B:
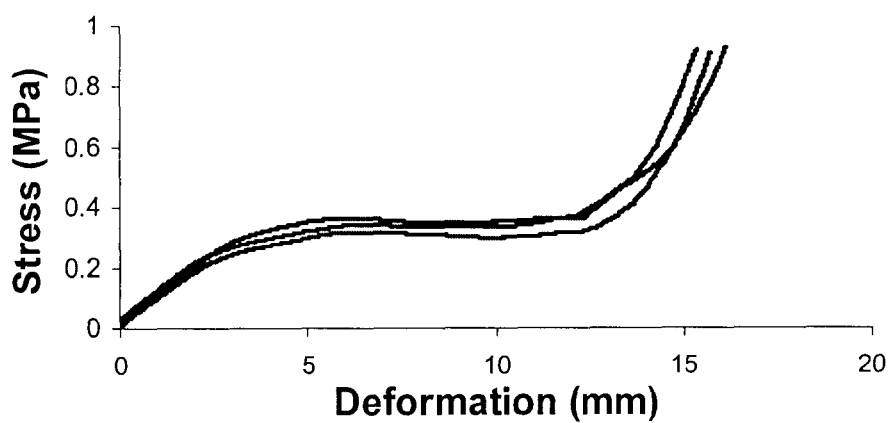
Figure 4C:
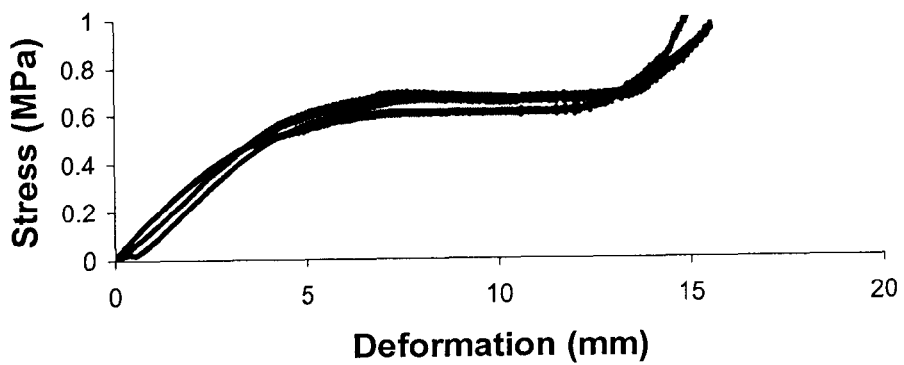

The results for aluminium sheet (Standard aluminium, 1050H24) of 0.5 mm, 0.7 mm and 0.9 mm thicknesses are shown in FIGS. 4a, 4b and 4c respectively. The results are static test results obtained by slowly compressing a 200 mm by 200 mm moulded sheet. Using this material, about twenty to forty cells (projections) in the area of the sheet gives good results. As can be seen, all the curves show a plateau, at a higher stress level with higher thicknesses. The plateau length is a substantial portion of the deformation range, up to 65%. The results for 0.5 mm and 0.7 mm show that with the configuration used the range of sheet thicknesses from 0.5 mm to 0.7 mm gives a plateau in the range of 0.2–0.3 MPa that is preferred for an impact absorbing structure.

Figure 5:
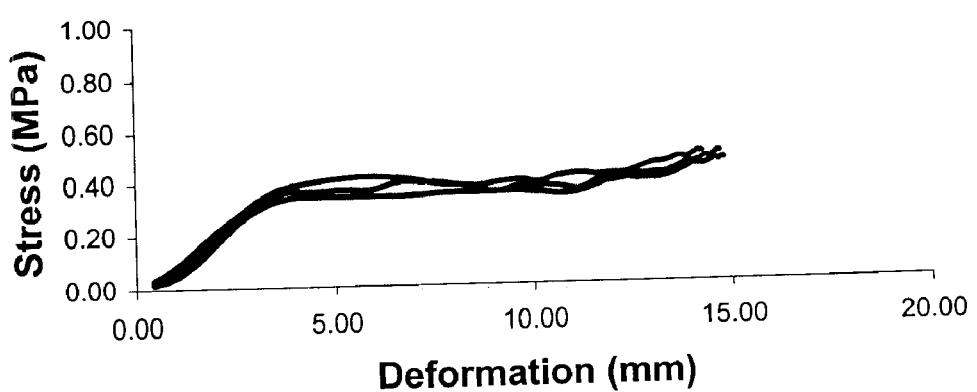
FIG. 5 shows a graph of dynamic stress against deformation when a sheet is impacted with a flat part.
Figure 6:
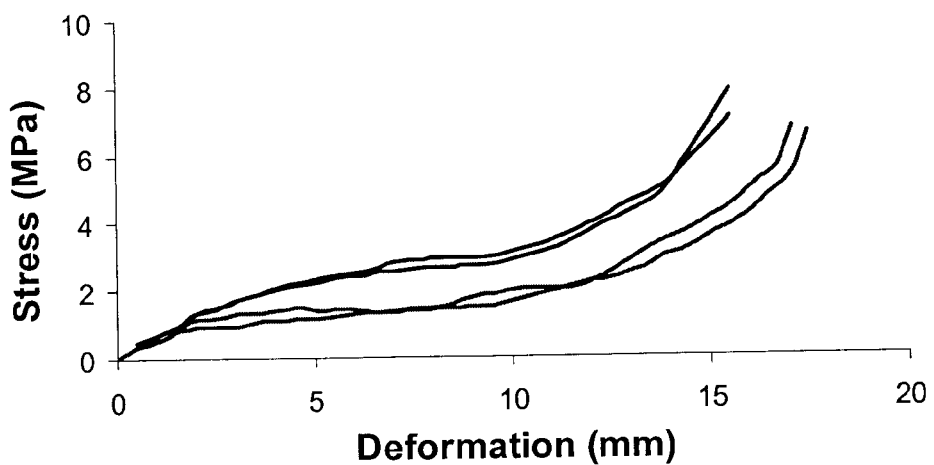
FIG. 6 shows a graph of dynamic stress against deformation when a sheet is impacted with a round part.
Figure 7A:
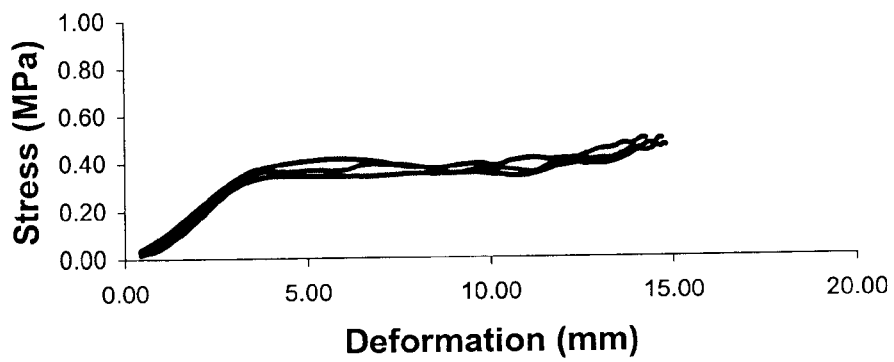
FIG. 7 shows static stress against deformation of a sheet for three skin thicknesses and without a skin.
Figure 7B:
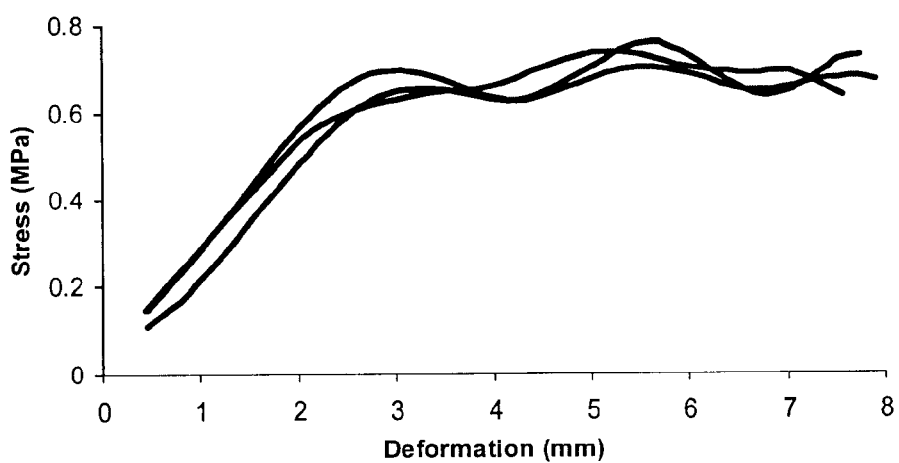
Figure 7C:
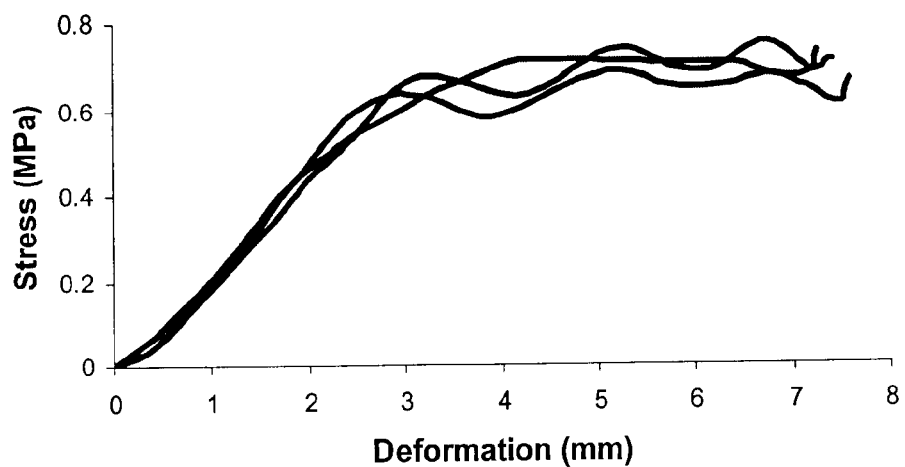
Figure 7D:
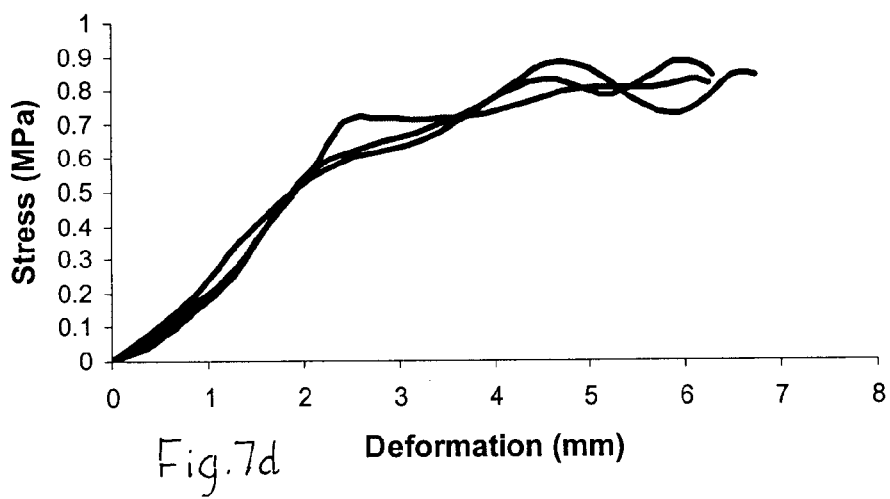

Dynamic test results using a flat and round head impacting the sheet at 4.2 m/s are shown in FIGS. 5 and 6 respectively. The round head is a dome with a base diameter of 106 mm. A good plateau is seen in the stress-deformation curve, especially with a flat head.

The results for the round head show some variation over the sheet depending on the number of projections hit. This variation can be reduced using a skin over the face of the sheet. This additional skin is particularly useful if the pitch of the projections becomes too large, i.e. if the gap between neighbouring projections is too large. Results for a standard skin adhered with polyurethane adhesive to a 1 mm sheet as used above are shown in FIG. 7. The plateau remains.

Good Head injury criteria (HIC) results have been obtained, similar to the values obtained with much more expensive honeycomb structures.

The sheet has also been found to absorb some horizontal energy in glancing impacts, especially if the sheet is not fixed to its support but allowed to move.

Further, two or more formed sheet structures give good results when stacked together. One sheet may be inverted and then fixed in place on another sheet projection against projection. If one of the sheets were not inverted it would just nest in the other.

It has been found that providing a skin between the two formed sheet structures appears to reduce the plateau in the stress-deformation curve so it is preferred to omit such an interskin.

Figure 8:
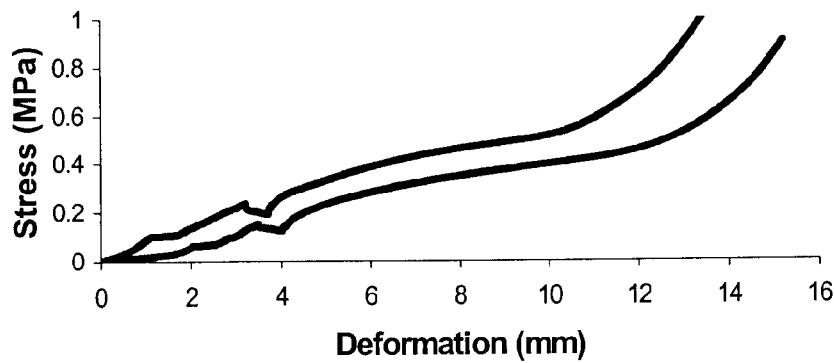
FIG. 8 shows shows static stress against deformation for conventional polyurethane foam.

For comparison, the results for two samples of polyurethane foam absorber are presented in FIG. 8. As can be seen, the conventional foam does not exhibit a plateau in the stress-deformation curve.

The amount of energy absorbed corresponds to the area under the curve. To maximise the area below a predetermined maximum stress level, which may cause injury or death, the curve should be substantially flat just below that level, i.e. should have a plateau. In general, more energy can be absorbed by the energy-absorbing components according to the invention than is possible using polyurethane foam, for a given predetermined maximum stress.

The component may display good energy absorption, excellent stress to weight ratio, good bending and torsional stress, especially in dual skin systems, and very flat plateaux in the stress-deformation curve. The material is also cheap compared to prior vehicle energy absorbers, recyclable and safe. A continuous sheet also assists in waterproofing.

Apart from the aluminium used in the specific examples described, it is also possible to make the vehicle component out of other metals or thermoplastic, such as polycarbonate or polyamide. It may be easier to use a smaller pitch between peaks using thermoplastic rather than aluminium, using injection moulding.

When mounted in the base of a seat the component according to the invention can also provide protection against submarining.

The material can also function as a thermal or sound insulator. In addition to a hollow sheet, material can also be provided around the projections, such as foam.

I claim:

1. An energy-absorbing vehicle component for reducing the risk of injuries, wherein
    the component comprises a sheet extending substantially in a median plane and formed to have a pattern of alternating front and rear projections in front of and behind the median plane, the projections being arranged to alternate in two directions in the median plane without substantial flat areas therebetween with each projection having a frusto-conical pitch region with the sheet inclined at an angle of 25 to 60 degrees from the median plane of the sheet at the position of maximum steepness in the pitch region whereby the sheet absorbs impact by bending in the pitch region so as to provide a plateau at a predetermined level in the curve of stress normal to the median plane required to deform the sheet against increasing deformation.

2. A component according to claim 1 wherein the maximum steepness occurs midway between the centres of the adjacent front and rear projections.

3. A component according to claim 1 wherein the projections cover at least 80% of the area of the sheet.

4. A component according to claim 1, wherein the said median plane of the component is not flat.

5. A component according to claim 1, wherein the projections have flat faces which extend parallel to the said median plane.

6. A component according to claim 1, wherein the projections are hollow.

7. A component according to claim 1, wherein the material of the sheet, the thickness of the sheet and the density of projections over the area of the sheet are predetermined such that the plateau level is at a level of stress that does not cause serious injury or that avoids death when a living human body part such as a head impacts the energy-absorbing sheet.

8. A component according to claim 1 further comprising a skin on one side of the sheet.

9. A component according to claim 8 wherein the skin is attached to the sheet such that lateral movement of the skin against the sheet is possible during impact.

10. A component according to claim 8 comprising a skin on both sides of the sheet.

11. A component according to claim 10 wherein each skin is attached to the sheet such that lateral movement of the skins against the sheet is possible during impact.

12. A component according to claim 11 wherein the skin is attached to the sheet using polyurethane adhesive.

13. A component according to claim 1 wherein the material of the sheet is aluminium.

14. A component according to claim 13 wherein the sheet has a thickness of 0.5 mm to 0.7 mm.

15. A vehicle comprising an energy-absorbing vehicle component for reducing the risk of injuries, wherein
    the component comprises a sheet extending substantially in a median plane and formed to have a pattern of alternating front and rear projections in front of and behind the median plane, the projections being arranged to alternate in two directions in the median plane without substantial flat areas therebetween and each projection having a frusto-conical pitch region with the sheet inclined at an angle of 25 to 60 degrees from the median plane of the sheet at the position of maximum steepness in the pitch region whereby
    the sheet absorbs impact by bending in the pitch region so as to provide a plateau at a predetermined level in the curve of stress normal to the median plane required to deform the sheet against increasing deformation.

16. A vehicle according to claim 15 wherein the vehicle has a headlining and the component is mounted behind the headlining.

17. A method of absorbing energy comprising
    providing a component comprising a sheet extending substantially in a median plane and formed to have a pattern of alternating front and rear projections in front of and behind the median plane, the projections being arranged to alternate in two directions in the median plane without substantial flat areas therebetween and each projection having a frusto-conical pitch region with the sheet inclined at an angle of 25 to 60 degrees from the median plane of the sheet at the position of maximum steepness in the pitch region;
    absorbing impact by bending in the pitch region so as to provide a plateau at a predetermined level in the curve of stress normal to the median plane required to deform the sheet against increasing deformation.

* * * * *